(12) United States Patent
Albers et al.

(10) Patent No.: US 7,272,274 B1
(45) Date of Patent: Sep. 18, 2007

(54) MODULE TO COUPLE TO AN ELECTRICAL AND AN OPTICAL BACKPLANE IN A CHASSIS

(75) Inventors: Robert J. Albers, Folsom, CA (US); Edoardo Campini, Mesa, AZ (US); Hassan Fallah-Adl, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/393,067

(22) Filed: Mar. 30, 2006

(51) Int. Cl.
*G02B 6/12* (2006.01)
*H04J 14/08* (2006.01)
*H01R 33/945* (2006.01)

(52) U.S. Cl. .............. 385/14; 385/15; 385/88; 385/89; 385/92; 385/129; 385/130; 398/98; 398/101; 439/577

(58) Field of Classification Search ........... 385/15, 385/14, 53, 55, 56, 58, 59, 76, 77, 78, 88, 385/89, 92, 94, 139, 129, 130, 131; 398/50, 398/52, 34, 98, 101; 439/577
See application file for complete search history.

(56) References Cited

U.S. PATENT DOCUMENTS

| | | | | |
|---|---|---|---|---|
| 5,513,293 A | * | 4/1996 | Holland et al. | 385/134 |
| 5,896,473 A | * | 4/1999 | Kaspari | 385/24 |
| 6,661,940 B2 | * | 12/2003 | Kim | 385/15 |
| 7,186,032 B1 | * | 3/2007 | Stevens et al. | 385/53 |
| 2002/0048066 A1 | * | 4/2002 | Antoniades et al. | 359/128 |
| 2002/0150339 A1 | * | 10/2002 | Byers et al. | 385/39 |
| 2004/0033079 A1 | * | 2/2004 | Sheth et al. | 398/135 |
| 2004/0067006 A1 | * | 4/2004 | Welch et al. | 385/14 |
| 2005/0100340 A1 | * | 5/2005 | Nishimura | 398/135 |

\* cited by examiner

*Primary Examiner*—Brian M. Healy
(74) *Attorney, Agent, or Firm*—Guojun Zhou

(57) ABSTRACT

A chassis includes a plurality of slots to receive modules. The chassis includes an electrical backplane to couple to a module received in a first slot of the plurality of slots. The module to couple via a first communication interface on the module. An optical backplane is also included in the chassis. The optical backplane is to couple to the modules via a second communication interface on the module. The optical backplane is to couple to the second interface on the module via at least one interconnect through an opening in the electrical backplane. The interconnect configured to couple a fabric interface associated with the second communication interface to a communication channel routed over the optical backplane.

27 Claims, 13 Drawing Sheets

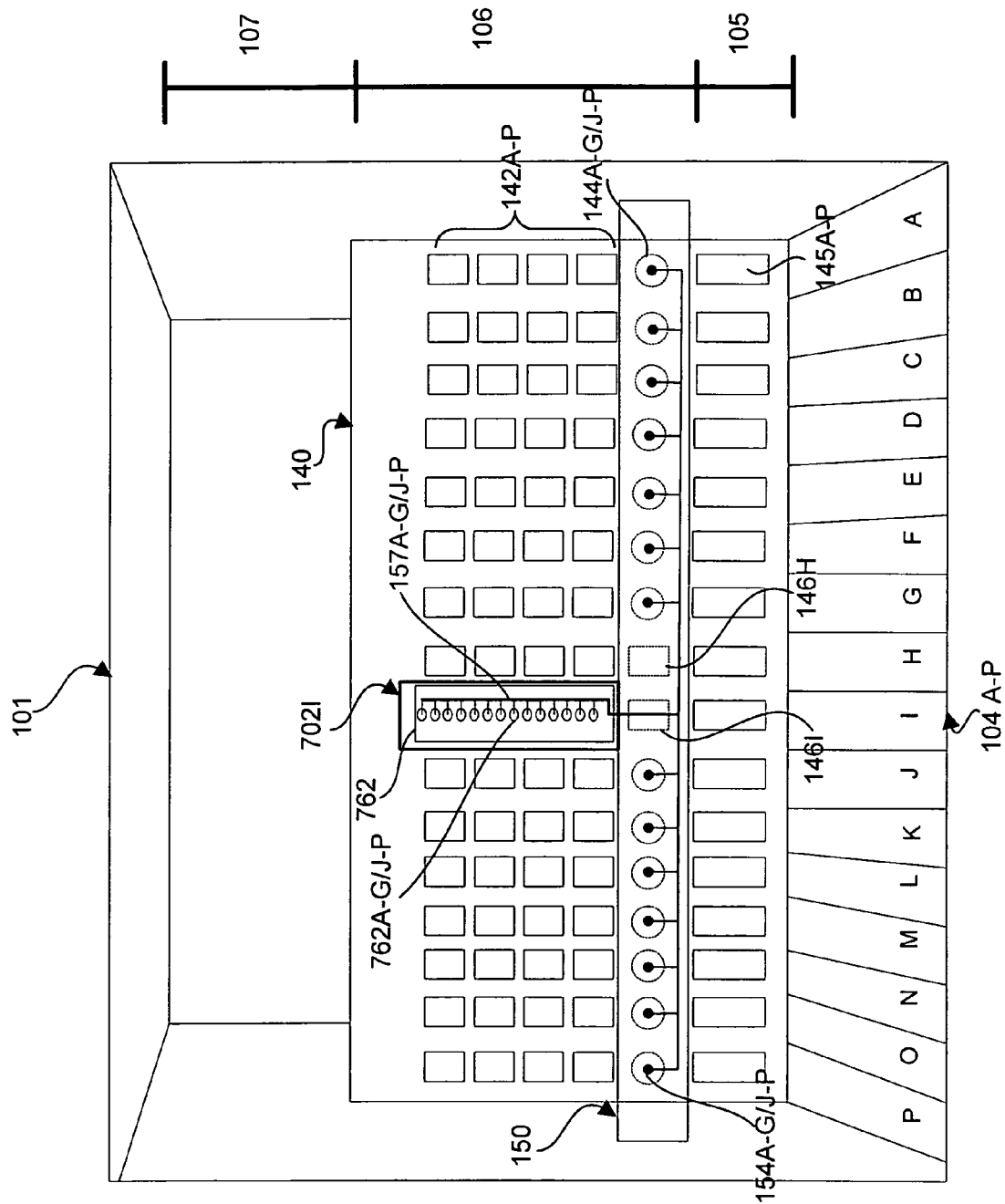

MODULE TO COUPLE TO AN ELECTRICAL AND AN OPTICAL BACKPLANE IN A CHASSIS

BACKGROUND

Modular platform systems are typically used in communication networks where reliability is increased and cost reduced by the use of interoperable pieces. Such interoperable pieces may include modular platform shelves or chassis. Typically, each modular platform chassis receives and couples in communication various interoperable pieces or modules. These modules may include circuit boards or mezzanine cards. These boards and mezzanine cards may include, but are not limited to, blades, carrier boards, processing boards, switches, hubs, etc. Other interoperable modules that are received and coupled in a modular platform chassis may include components such as fans, power equipment modules (PEM), field replaceable units (FRUs), alarm boards, etc.

Some industry initiatives are seeking ways to standardize the way modules in a modular platform system interoperate. One such initiative is the PCI Industrial Computer Manufacturers Group (PICMG), Advanced Telecommunications Computing Architecture (ATCA) Base Specification, PICMG 3.0 Rev. 2.0, published Mar. 18, 2005, and/or later versions of the specification ("the ATCA specification"). Typically modules designed to operate according to the ATCA specification are received in slots in a modular platform chassis. These modules may then couple to a backplane via a communication interface that is associated with a fabric interface.

BRIEF DESCRIPTION OF THE DRAWINGS

FIGS. 8A-B provides a partial rear view of the modular platform chassis illustrating example routes for communication channels over the optical backplane to the mezzanine card;

DETAILED DESCRIPTION

Figure 1:
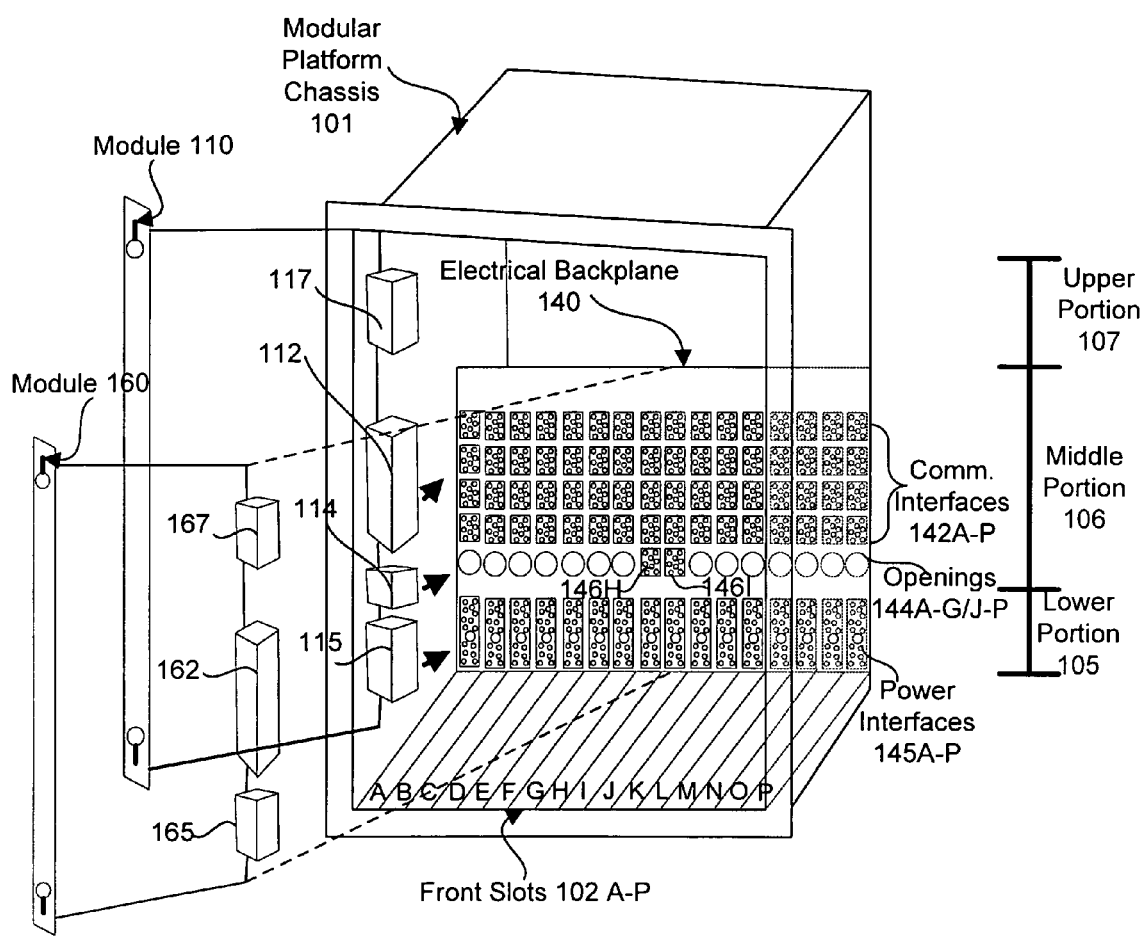
FIG. 1 provides a partial front view of an example modular platform system with modules to be received in slots in an example modular platform chassis.

As mentioned in the background, modules that are received in slots in an ATCA compliant modular platform chassis may couple to a backplane via communication interfaces associated with a fabric interface. As a result, in one example, these modules may couple in communication via the fabric interface to each other through one or more communication channels that are routed over the backplane. These communication channels may be used to forward data from each module's fabric interface and then through portions of the communication channel that are routed over the backplane and/or through other elements in the ATCA modular platform chassis (e.g., switches or hubs). At least a portion of the data, for example, is forwarded to other modules coupled to the backplane.

Typically, a single backplane in a modular platform chassis is limited in the number of communication channels allocated to forward data from a module that couples to it via a fabric interface. For example, a type of ATCA compliant modular platform chassis is designed to receive and couple in communication 16 modules. For this ATCA design, 14 modules or boards may be coupled in communication through two switch modules. This configuration is referred to in the ATCA specification as a dual-star fabric topology. In a dual-star fabric topology, according to the ATCA specification, no more than one communication channel is provided to a non hub/switch module to forward data to another module via its fabric interface when coupled to an ATCA backplane. A single communication channel may result in a bottleneck for data forwarded from this non hub/switch module. Additionally, the high throughput demands (e.g., plurality of Gigabits/second) are pushing the physical limits of typical electrical backplanes that include copper-based traces to route communication channels.

Data bottlenecks are problematic to the throughput of data forwarded through a module's fabric interface and may limit the throughput capability of a modular platform system as a whole. The physical limits of typical copper-based traces included in electrical backplanes are also problematic to throughput capabilities. But most of today's standardized modular platform modules are designed to operate with electrical backplanes and likely will not operate solely with other types of alternative backplanes (e.g., optical-based).

In one example, a chassis includes a plurality of slots to receive modules. The chassis includes an electrical backplane to couple to a module received in a first slot of the plurality of slots. The module couples via a first communication interface on the module. An optical backplane is also included in the chassis. The optical backplane is to couple to the modules via a second communication interface on the module. The optical backplane is to couple to the second communication interface on the module via at least one interconnect through an opening in the electrical backplane. The interconnect configured to couple a fabric interface associated with the second communication interface to a communication channel routed over the optical backplane.

FIG. 1 provides a partial view of an example modular platform system 100 with modules to be received in slots in example modular platform chassis 101. As depicted in FIG. 1, modules (e.g., front boards) 110 and 160 are to be received in front slots 102A and 102I from among front slots 102A-P. As described below (FIG. 2), modular platform chassis 101 also includes rear slots 104A-P to receive modules (e.g., rear transition modules (RTMs).

In one implementation, modular platform chassis 101 includes an electrical backplane 140. Electrical backplane 140, as depicted in FIG. 1, includes communication interfaces 142A-P, 146H and 146I. Communication interfaces 142A-P couple to communication interfaces on modules received in front slots 102A-P. For example, communication interface 142A couples to communication interface 112 on module 110 and communication interface 142I couples to a portion of communication interface 162 on module 160. In one example, another portion of communication interface 162 couples to communication interface 146I.

Electrical backplane 140, in one example, is also depicted in FIG. 1 as including power interfaces 145A-P. These power interfaces, for example, provide power to modules received in front slots 102A-P. For example, power interfaces 145A and 145I couple to power interfaces 115 and 165 on modules 110 and 160, respectively.

In one implementation, electrical backplane 140 includes openings 146A-G/J-P. Openings 146A-G/J-P, as described more below, may have one or more interconnects on a module that couple to an optical backplane (e.g., see FIG. 3) through these openings. This coupling may also include all or a portion of a communication medium (e.g., an optical path) that routes a communication channel through openings 146A-G/J-P and then over the optical backplane.

In one example, modular platform chassis 101 is designed to operate in compliance with the ATCA specification. Additionally, electrical backplane 140 and modules received in front slots 102A-P or rear slots 104A-P may also be designed to operate in compliance with the ATCA specification, although this disclosure is not limited to only ATCA complaint modular platform chassis, backplanes and modules but may also apply to Compact Peripheral Component Interface (cPCI), VersaModular Eurocard (VME), or other types of industry standards governing the design and operation of chassis, backplanes and modules. In addition, this disclosure may also apply to proprietary chassis, backplanes and modules designed to operate in a modular platform system.

In one ATCA implementation, modular platform chassis 101 is divided into three regions described in the ATCA specification as "zones." These zones include zones 1-3. According to the ATCA specification zone 1 is to include power interfaces (e.g., power interface 145A-P) and is depicted in FIG. 1 as lower portion 105. Zone 2 is to include data interfaces (e.g., communication interfaces 142A-P and 146H-I) and is depicted in FIG. 1 as middle portion 106. Zone 3 is to include an area for RTMs to couple to modules received in front slots 102A-P and is depicted in FIG. 1 as upper portion 107.

The ATCA specification refers to zone 2 as the data transport connector zone. Typically, ATCA reserves space for five connectors in zone 2 for data transport. However, hub or switch modules are usually the only modules that use all five data transport connectors in zone 2. In one ATCA implementation, communication interfaces 142A-P includes four data transport connectors to couple electrical backplane 140 to communication interfaces on modules received in front slots 102A-P. In addition, communication interfaces 146H and 146I each include one data transport connector to provide the fifth data transport connector for a hub or switch module to be inserted in front slots 102H or 102I, respectively.

In one ATCA implementation, FIG. 1 depicts that communication interface 112 on module 110 is to couple to communication interface 142A on electrical backplane 140 in middle portion 106 (ATCA zone 2). Also, communication interface 162 on module 160 is to couple to communication interfaces 142I and 146I in middle portion 106. Since module 160 couples to the fifth data transport connector, in one example, module 160 is portrayed in FIG. 1 as a hub or switch module for an ATCA compliant modular platform system 100.

ATCA compliant modules 110 and 160, in one example, may also couple to an RTM in upper portion 107. Thus, in this example, module 110 includes a communication interface 117 and module 160 includes a communication interface 167 to couple to an RTM in upper portion 107 when these modules are received in, for example, front slots 102A-P.

In one example, communication interface 112 on module 110 and communication interface 162 each are associated with a fabric communication interface. The fabric interface, for example, is used to forward data through a communication channel, a portion of which is routed over electrical backplane 140. At least some of the data, for example, may be forwarded to other modules received in front slots 102A-P and/or rear slots 104A-P.

In one implementation, an ATCA compliant modular platform chassis 101 is configured in a dual-star fabric topology. As mentioned above, a single communication channel is provided to a non hub/switch module coupled to an ATCA compliant backplane to forward data via the module's fabric interface to other modules coupled to electrical backplane 140. So in this example, communication interface 112 on module 110 couples to communication interface 142A and data is forwarded though the fabric interface and then through portions of the communication channel routed over electrical backplane 140. Since module 160 is depicted as a hub/switch module, at least a portion of the data, in this dual-star example, is forwarded through module 160 and then to other modules (not shown) that are coupled to electrical backplane 140 or to modules located remotely to modular platform chassis 101. Also, as part of the dual-star topology, a second hub/switch module (not shown) may be received in slot 102H. The second hub/switch module, for example, provides redundant and/or load-balancing switch capabilities to modular platform system 100.

In one example, the space or location typically used for the fifth data transport connector for non-hub or non-switch modules is replaced with an opening (e.g., openings 144A-G or 144J-P) through an ATCA compliant electrical backplane 140. As described more below, at least one interconnect couples to optical backplane 150 through an opening in electrical backplane 140. This interconnect, for example, may couple a fabric interface associated with communication interface 114 on module 110 to communication channels routed over optical backplane 150. This fabric interface may be in addition to or part of the fabric interface associated with communication interface 112 that is coupled to electrical backplane 140.

In one implementation, a fabric interface for a module received in modular platform chassis 101 may be designed to support one or more packet-based communication protocols. Several packet-based communication protocols, for example, are associated with and/or described by sub-set specifications to the ATCA specification and are typically referred to as the "PICMG 3.x specifications." The PICMG 3.x specifications include, but are not limited to, Ethernet/Fibre Channel (PICMG 3.1), Infiniband (PICMG 3.2), Star-Fabric (PICMG 3.3), PCI-Express/Advanced Switching (PICMG 3.4), Advanced Fabric Interconnect/S-RapidIO (PICMG 3.5) and Packet Routing Switch (PICMG 3.6).

In one example, a fabric interface associated with communication interface 112 or a fabric interface associated with communication interface 162 may operate in compliance with a communication protocol described in a PICMG 3.x specification. This PICMG 3.x specification support, for example, is to facilitate the forwarding of data from module 110 and through portions of the communication channels routed over electrical backplane 140.

In other implementations, a fabric interface for a module received in modular platform chassis 101 may be designed to support other types of communication protocols. For example, the communication interface may support time division multiplexing (TDM) and/or frequency division multiplexing (FDM). A communication interface that supports TDM, for example, may operate in compliance with one or more industry standard associated with interconnects configured to couple to optical backplanes. One such industry standard is the Optical Internetworking Forum (OIF), TFI-5: TDM Fabric to Framer Interface Implementation, published September, 2003 and/or later versions ("the TFI-5 specification").

In one example, fabric interfaces associated with communication interfaces on modules that couple to electrical backplane 140 in modular platform chassis 101 operate in compliance with one or more PICMG 3.x specifications. In this example, fabric interfaces associated with communication interfaces on modules that couple to optical backplane 150 operate in compliance with TDM-based standard such the TFI-5 specification. Thus, packet-based communication protocols can be used to forward data from modules via communication channels routed over electrical backplane 140 and TDM-based communication protocols can be used to forward data from modules via communication channels routed over optical backplane 150.

Figure 2:
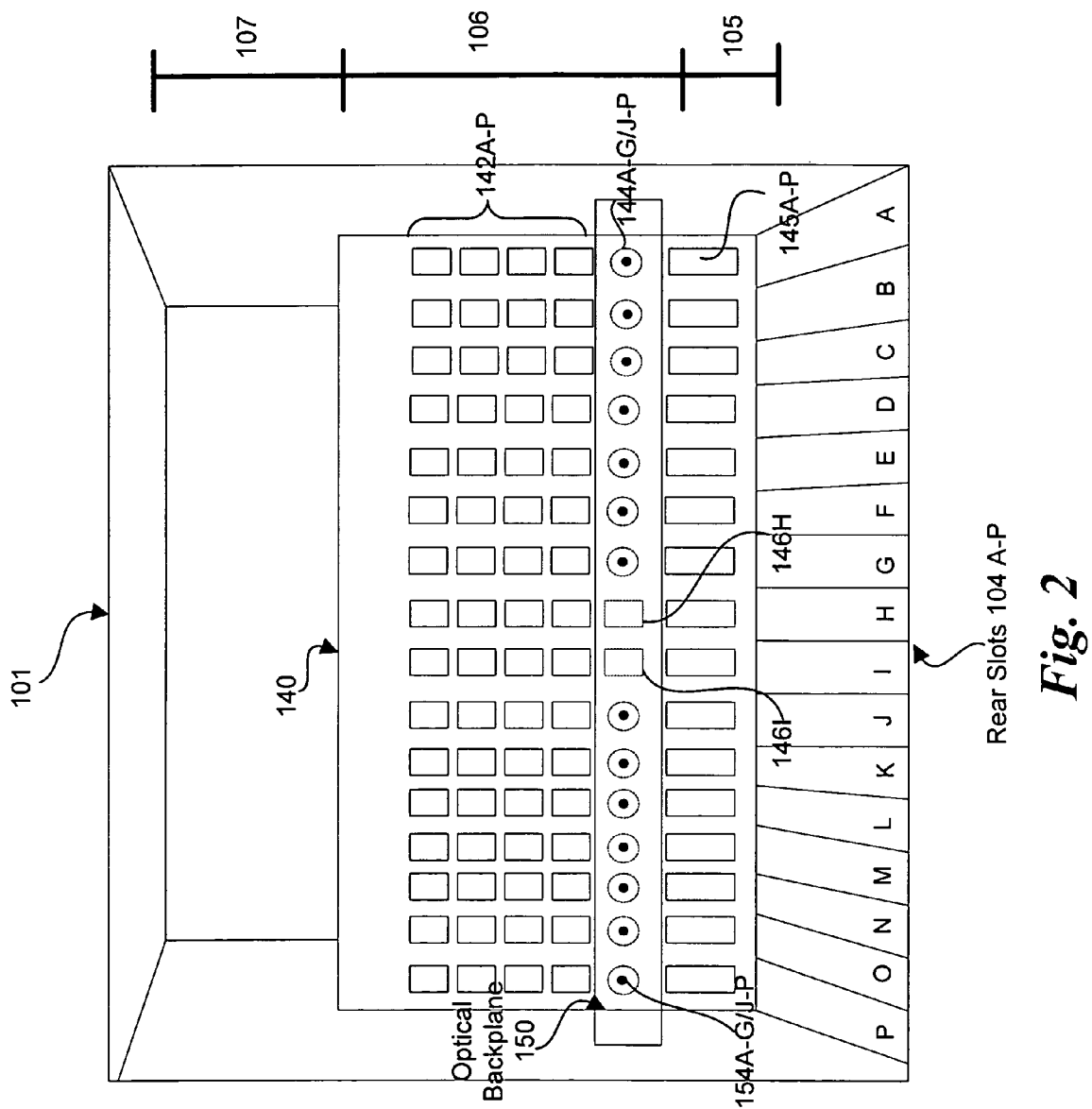
FIG. 2 provides a partial rear view of the modular platform chassis with an electrical and an optical backplane.

FIG. 2 provides a partial rear view of modular platform chassis 101 with electrical backplane 140 and optical backplane 150. In one example, optical backplane 150 is located or mounted adjacent to openings 144A-G and 144J-P in electrical backplane 140. These openings are depicted as dashed-lined shapes to indicate where these openings are located on the side of optical backplane 150 that is towards the front of modular platform chassis 101 or adjacent to the backside or rear of electrical backplane 140. Similarly, the back-side of communication interfaces 146I and 146H on electrical backplane 140 are also depicted as dashed-line shapes.

FIG. 2, in one example, depicts modular platform chassis 101 as including rear slots 104A-P. In one implementation, these slots may receive modules such as RTMs. Once received in a rear slot, for example, an RTM may couple to a module or front board received in a corresponding front slot. For example, an RTM received in rear slot 104A would couple to a module received in front slot 102A.

As mentioned for FIG. 1, electrical backplane 140 includes communication interfaces 142A-P and 146H-I. In one ATCA compliant implementation, the rear view of the zone 2 data transport connectors associated with communication interfaces 142A-P and 146H-I as well as zone 1 power interfaces 145A-P are portrayed in FIG. 2. This portrayal provides a reference point to where an example optical backplane 150 may be mounted in modular platform chassis 101 in a position on the opposite or opposing side to openings 144A-G/J-P of electrical backplane 140.

In other implementations, as described below, optical backplane 150 is not mounted directly behind the openings in electrical backplane 140. In these other implementations, the communication channels that are routed over optical backplane 150 include routes (e.g., optical paths) that are routed directly from a module received in front slots 102A-G/J-P to a communication interface. This communication interface, for example, may be on switch module (e.g., module 160) received in front slot 102H or 102I, on a mezzanine card mounted on the backside of electrical backplane 140 or on an RTM received in rear slots 102H-I, although this disclosure is not limited to routes to communication interfaces on these types of switch modules, mezzanine cards or RTMs.

In one implementation, optical backplane 150 includes communication interfaces 154A-G/J-P. Communication interfaces 154A-G/J-P, for example, are the beginnings of optical paths that couple to communication interfaces on at least a subset of modules received in front slots 102A-G/J-P. In one example, these communication interfaces couple via one or more interconnects through openings 144A-G/J-P. As described more below, these interconnects may be configured or adapted to couple fabric interfaces included in the communication interfaces on the modules to communication channels routed over optical backplane 150.

Figure 3:
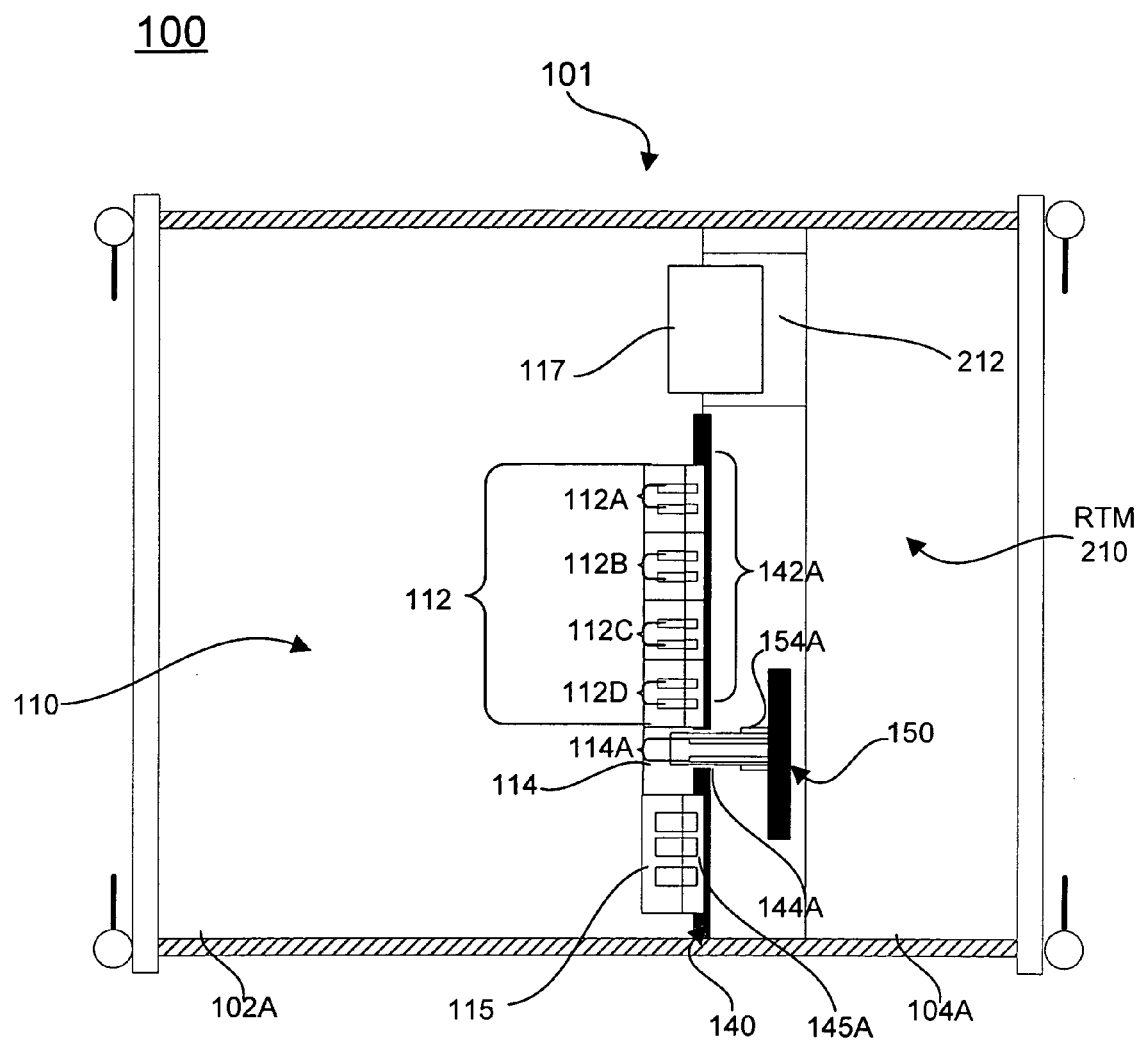
FIG. 3 provides a partial side view of the modular platform chassis with modules received in front and rear slots and the front slot module coupling to electrical and optical backplanes.

FIG. 3 provides a partial side view of modular platform chassis 101 with module 110 received in front slot 102A and a module, RTM 210, received in rear slot 104A. As described above for FIG. 1, module 110 includes communication interfaces 112 and 114 to couple to communication interfaces on electrical backplane 140 and optical backplane 150, respectively. Also, FIG. 3 shows a RTM 210 coupled to module 110 via communication interface 212.

In one implementation, module 110, electrical backplane 140 and RTM 210 are each designed to operate in compliance with the ATCA specification. As a result, communication interface 212 on RTM 210 couples to module 110 via communication interface 117 in ATCA connector zone 3. These zone 3 communication interfaces, for example, may be associated with a fabric interface to forward data over a communication channel between RTM 210 and module 110.

In one implementation, various interconnects couple the communication interfaces on module 110 to communication channels routed over electrical backplane 140 and/or optical backplane 150. These interconnects are portrayed in FIG. 3 as interconnects 112A-D and 114A. At least one interconnect from among interconnects 112A-D, for example, couples a fabric interface associated with communication interface 112 to a communication channel routed over electrical backplane 140. Interconnect 114A, for example, couples a fabric interface associated with communication interface 114 to a communication channel routed over optical backplane 150.

In one example, interconnects 112A-D are configured to couple a fabric interface to a communication channel routed over electrical backplane 140. Interconnects 112A-D, for example, couple in an impedance controlled manner to copper-based traces included in communication interfaces 142A of electrical backplane 140. These copper-based traces, for example, route the communication channel over electrical backplane 140. Thus, in this example, copper-based traces are used as a medium to forward data between modules coupled to electrical backplane 140.

In one example, interconnect 114A is configured or adapted to couple a fabric interface associated with communication interface 114 to a communication channel routed over optical backplane 150. For example, interconnect 114A includes a two-dimensional (2-D), micro electromechanical systems (MEMS)-controllable micro lens array that has been integrated with a Vertical-Cavity-Surface-Emitting-Laser (VCSEL) array and a photodiode array. The VCSEL/photodiode arrays, for example, may be packaged in a flip-chip assembly. In one example, the VCSEL/photodiode arrays allow interconnect 114A to implement an electrical-to-optical conversion and conversely an optical-to-electrical conversion of data forwarded/received on optical backplane 150.

The communication channels routed over optical backplane 150, for example, include optical signals that are routed via optical paths that propagate the optical signal from interconnected 114A. For example, an optical path begins/terminates at communication interface 154A and includes, but is not limited to, plastic or glass fibers and/or plastic or glass waveguides. An optical signal, for example, may be forwarded from interconnect 114A with either single wavelength or wavelength division multiplexing (WDM). Thus, a module coupled to optical backplane 150, for example, can use the optical signal to forward data from a module coupled to optical backplane 150.

In one implementation, interconnects 112A-D for an ATCA compliant module 110 and electrical backplane 140 are high density, impedance controlled connectors as described in the ATCA specification. In this example, based on module 10's insertion in front slot 102A, interconnects 112A-D couple with communication interface 142A. As a result, a fabric interface associated with communication interface 112 is coupled to a communication channel routed over electrical backplane 140. As mentioned previously, copper-based traces may be use as a medium to route the communication channel over electrical backplane 140.

In one implementation, interconnect 114A is configured to include the VCSEL/photodiode arrays as described above. In this implementation, based on module 10's insertion in front slot 102A, interconnect 114A couples with communication interface 154A for optical backplane 150. As a result, a fabric interface associated with communication interface 114 is coupled to a communication channel routed over optical backplane 150. As mentioned previously, an optical path (e.g., optical fiber or waveguides) may be used as a medium to route the communication channel over optical backplane 150

Figure 4:
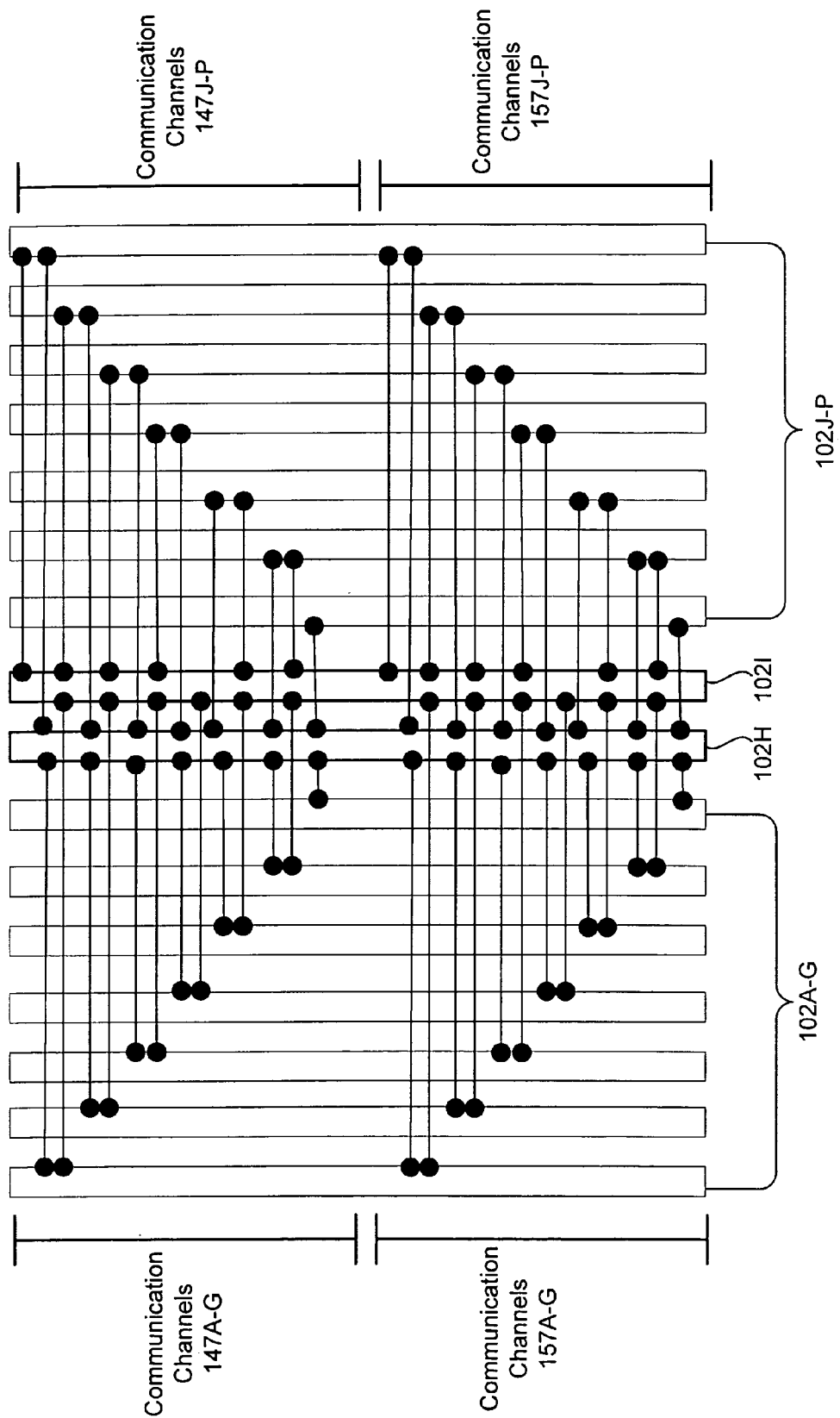
FIG. 4 provides a diagram of an example fabric architecture.

FIG. 4 provides a diagram of fabric architecture 400. In one example, fabric architecture 400 portrays the communication channels routed over electrical backplane 140 and optical backplane 150 in modular platform chassis 101. For example, communication channels 147A-G/J-P are routed over electrical backplane 140 and communication channels 157A-G/J-P are routed over optical backplane 150.

In one implementation, communication channels 147A-G/J-P include copper-based traces. These copper-based traces, for example, route communication channels from modules received in front slots 102A-G/J-P over electrical backplane 140, and to hub or switch modules received in front slot 102H-I. Thus, in this implementation, a fabric interface included in communication interface 112 on module 110 would couple to communication channel 147A when module 110 is received in front slot 102A.

In one implementation communication channels 157A-G/J-P include optical paths. As mentioned above, these optical paths include, for example, plastic or glass fibers and/or plastic or glass waveguides that route communication channels from modules received in front slots 102A-G/J-P and possibly through openings 144A-G/J-P, respectively, over optical backplane 150 and to communication interfaces on hub or switch modules, RTMs or mezzanine cards.

Figure 5:
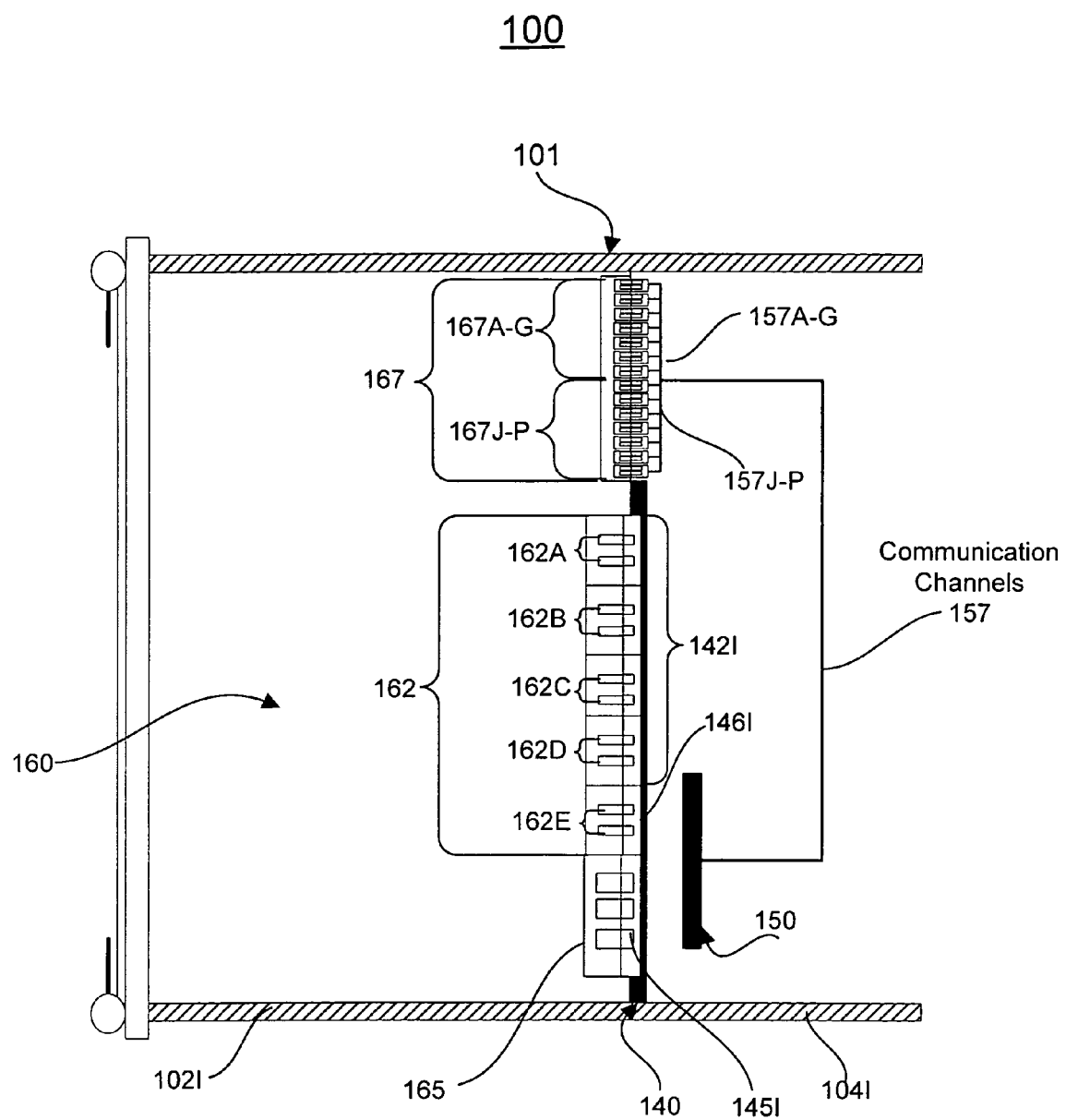
FIG. 5 provides a partial side view of the modular platform chassis with an example switch/hub module received in a front slot.

FIG. 5 provides a partial side view of modular platform chassis 101 with module 160 received in front slot 102I. As mentioned above, in one implementation, module 160 is a hub/switch module for modular platform system 100. As such, module 160 includes communication interface 162 that couples to communication interfaces 142I and 146I on electrical backplane 140 via interconnects 162A-D and 162E, respectively. Similar to interconnects 112A-D for module 110, in one example, interconnects 162A-E are configured to couple to a fabric interface associated with communication interface 162 to communication channels routed over electrical backplane 140.

In one example, module 160 includes communication interface 167. In one example, communication interface 167 includes interconnects 167A-G/J-P. These interconnects may be configured or adapted to couple a fabric interface associated with communication interface 167 to communication channels routed over optical backplane 150. This configuration may include the VSCEL/photodiode arrays in a flip-chip assembly as described above for interconnect 114A for FIG. 3. As shown in FIG. 5, communication channels 157A-G/J-P routed over optical backplane 150 may couple to interconnects 167A-G/J-P, respectively.

In one implementation, a module (e.g., module 110) may forward data via one of communication channels 157A-G/J-P. This data may follow an optical path that is used to route a communication channel from the module, over optical backplane 150 and to an interconnect included in communication interface 167. In this implementation, an optical-to-electrical conversion is completed by at least one interconnect 167A-G/J-P and the data is then forwarded by module 160 towards its destination, e.g., another module received in modular platform chassis 101 or remote to modular platform chassis 101, or processing elements resident on module 160 (not shown).

Figure 6A:
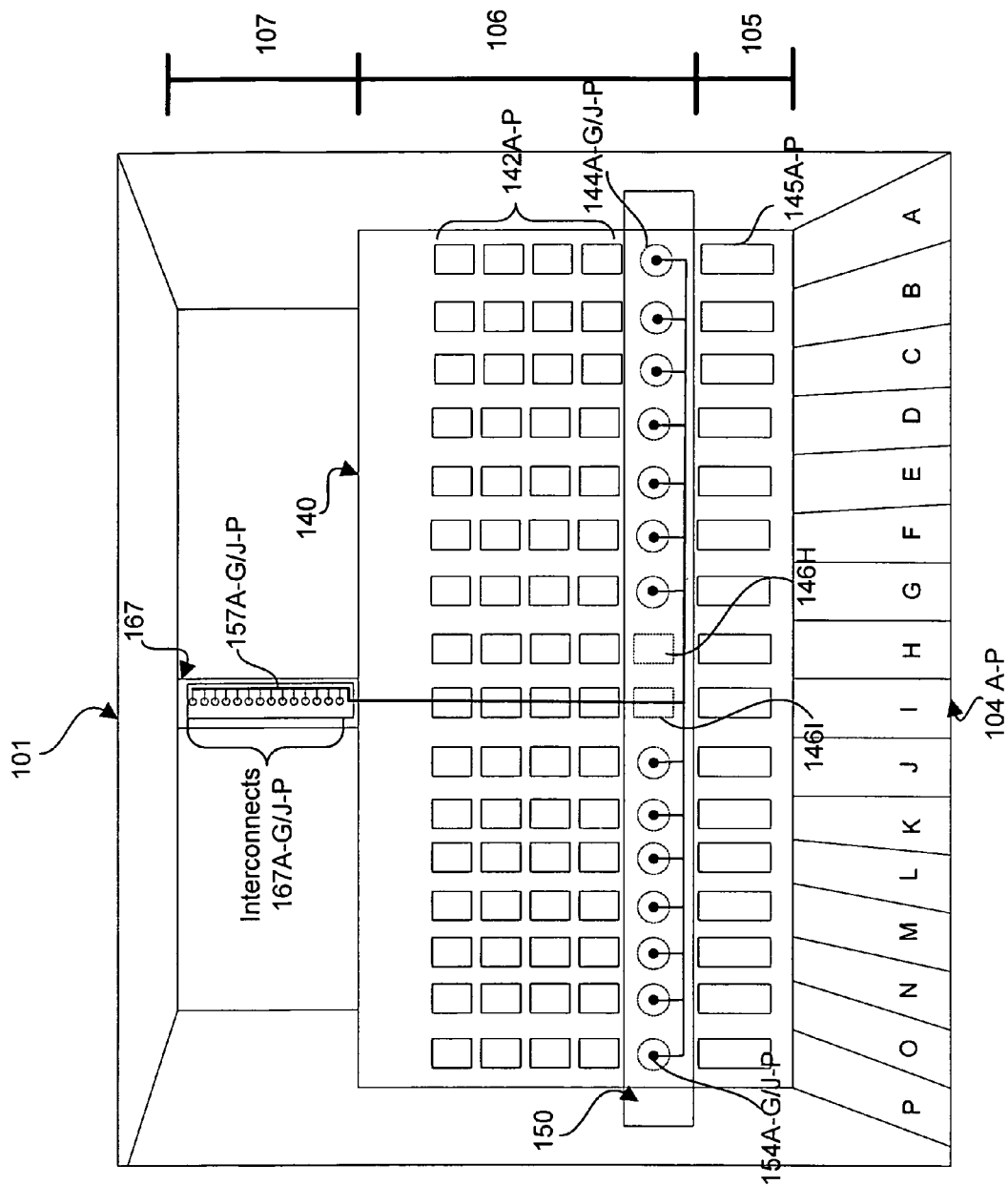
FIGS. 6A-B provide partial rear views of the modular platform chassis illustrating example routes for communication channels over the optical backplane to the switch/hub module received in the front slot.

FIG. 6A provides a partial rear view of modular platform chassis 101 with module 160 received in front slot 102I. As depicted in FIG. 6A, communication channels 157A-G/J-P are routed over optical backplane 150 when it is mounted directly behind openings 144A-G/J-P in electrical backplane 140 (e.g., in middle portion 106). In the example illustrated in FIG. 5A, communication channels 157A-G/J-P are horizontally routed to the location associated with front slot 102I. The communication channels are then routed vertically to communication interface 167. As mentioned above, in one example, once module 160 is received in a front slot of modular platform chassis 101, communication interface 167 is located in upper portion 107 (e.g. ATCA zone 3).

Figure 6B:
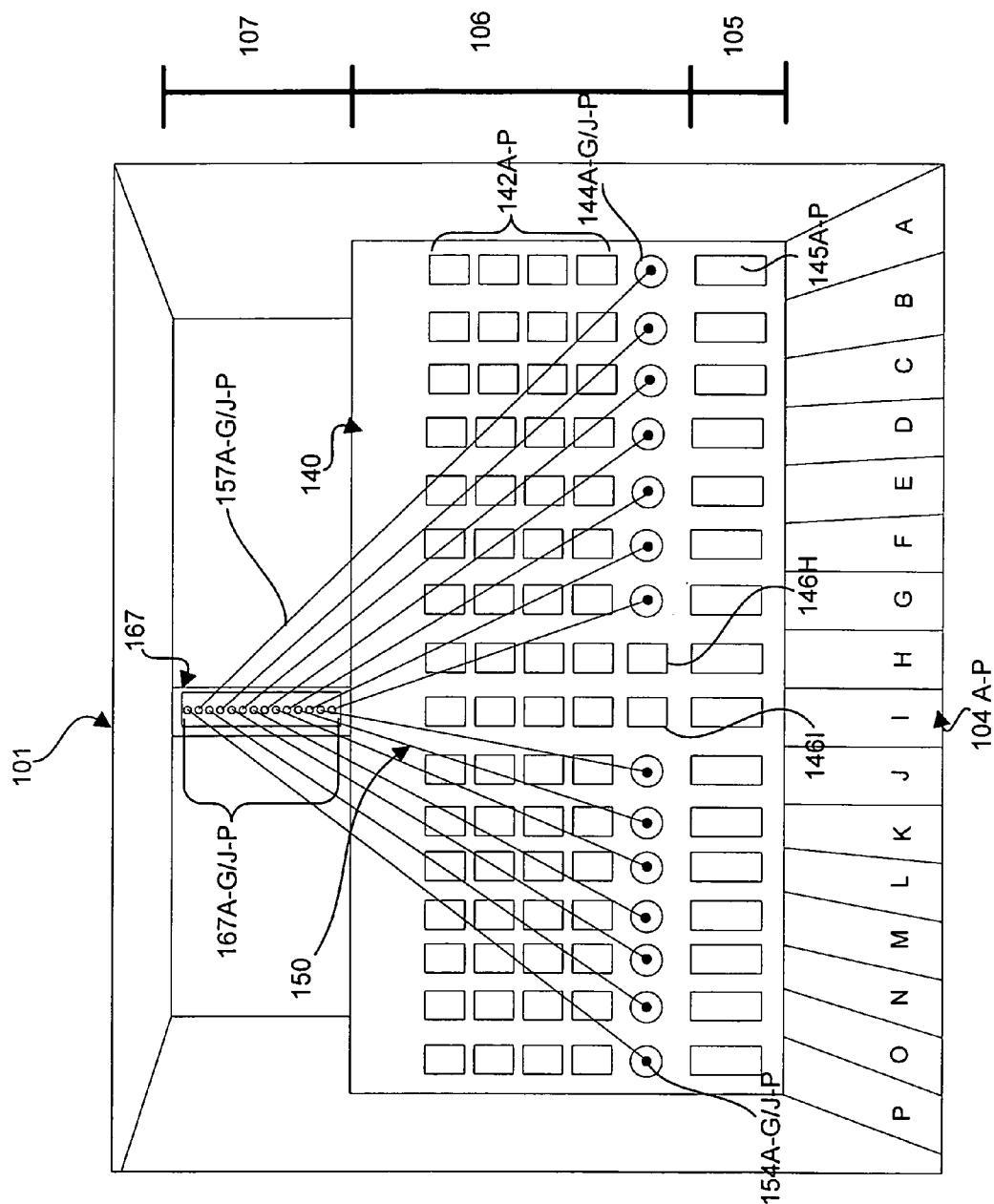

In one example, communication channel 157A may couple communication interface 154A to interconnect 167A and is routed as portrayed in FIG. 6A or routed directly as depicted in FIG. 6B. As mentioned above, communication interface 154A for optical backplane 150 includes the beginning or termination of an optical path that couples optical backplane 150 to a communication interface on a module received in front slot 102A. This optical path, for example, provides a medium to route a communication channel over optical backplane 150 and may forward or propagate a data signal using plastic or glass fibers and/or plastic or glass waveguides.

In one implementation, although FIG. 6B depicts direct communication paths, the communication paths in the aggregate are an example of optical backplane 150. Thus, optical backplane 150 may consist of communication paths that are grouped as shown in FIG. 6A or are directly routed as shown in FIG. 6B. This disclosure is not limited to only these types of direct or bundled communication channel routings.

Figure 7:
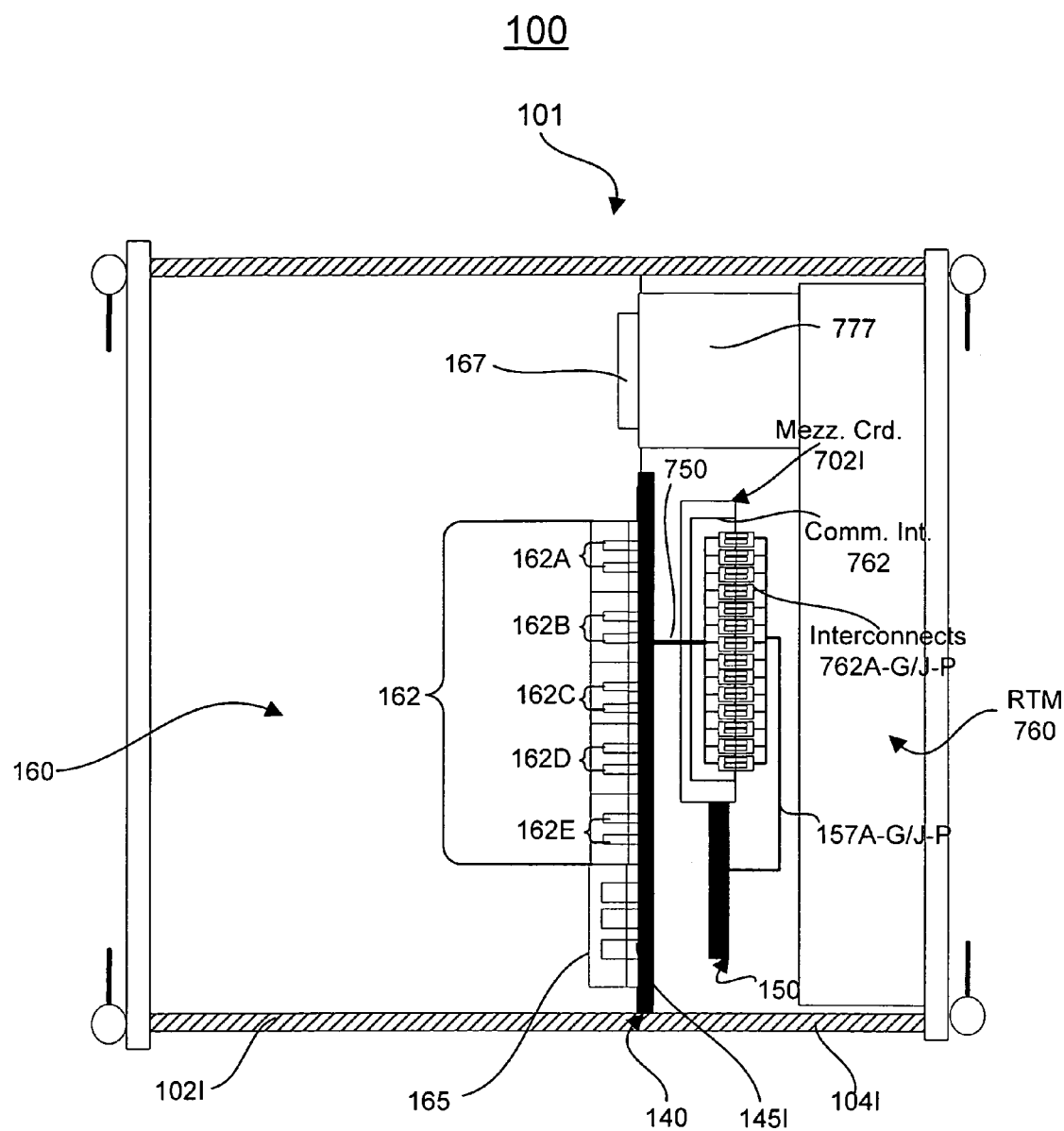
FIG. 7 provides a partial side view of the modular platform chassis with the switch/hub module, a rear transition module (RTM) received in a rear slot and an example mezzanine card.

FIG. 7 provides a partial side view of modular platform chassis 101 with module 160 received in front slot 102I and RTM 760 received in rear slot 104I. FIG. 7 also shows modular platform chassis 101 including a mezzanine card 702I. In one example, mezzanine card 702I is mounted behind electrical backplane 140 (towards rear slots 102I) and above an example optical backplane 150. As described in previous figures, this area of modular platform chassis is middle portion 106 and is referred to in the ATCA specification as zone 2.

In one implementation, mezzanine card 702I includes communication interface 762. Communication interface 762, for example, includes interconnects 762A-G/J-P. These interconnects may be configured to couple communication interface 762 to communication channels routed over optical backplane 150. This implementation may include the VSCEL/photodiode arrays in a flip-chip assembly as described above for interconnect 114A in FIG. 3. As shown in FIG. 7, communication channels 157A-G/J-P from optical backplane 150 may couple to interconnects 762A-G/J-P, respectively.

In one implementation, a module (e.g., module 110) may forward data via one of communication channels 157A-G/J-P. This data may follow an optical path that is used to route a communication channel from the module, over optical backplane 150 and to an interconnect included in communication interface 762. In this implementation, an optical-to-electrical conversion is completed by at least one interconnect 762A-G/J-P and the data is then forwarded via electrical path(s) 750 (e.g., routed over one or more copper-based traces) to communication interfaces on a hub/switch module received in front slot 102I (e.g., module 160). That hub/switch module may then forward the data towards its destination, e.g., another module received in modular platform chassis 101 or remote to modular platform chassis 101. In one example, interconnects 762A-G/J-P on mezzanine card 702I may reverse the process and convert electrical-to-optical to forward data from module 160 over optical backplane 150.

In one implementation, mezzanine card 702I, as shown in FIG. 7 is narrow enough to allow for RTM module 760 to couple to module 160 when module 160 is received in front slot 102I. In one example, a second mezzanine card (not shown) is also mounted behind electrical is backplane 140. The second mezzanine card may also couple to communication channels 157A-G/J-P and include one or more interconnects to perform optical-to-electrical conversions and forward the converted data signal to a module received in front slot 102H.

Figure 8B:
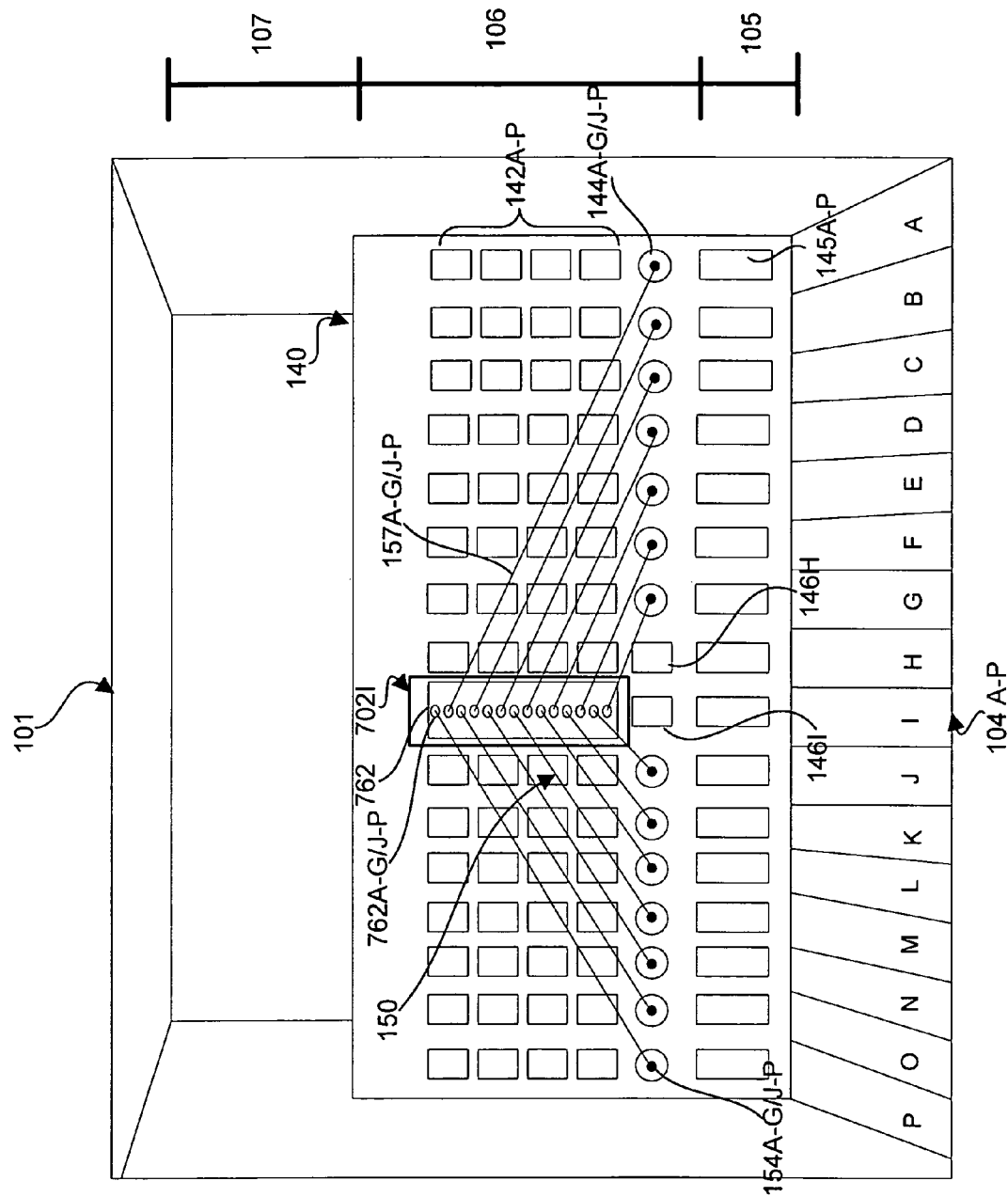

FIG. 8A provides a partial rear view of modular platform chassis 101 with mezzanine card 702I mounted behind electrical backplane 140. As depicted in FIG. 8A, communication channels 157A-G/J-P are routed over optical backplane 150. In the example illustrated in FIG. 8A, communication channels 157A-G/J-P are horizontally routed to the location associated with mezzanine card 702I. The communication channels are then routed vertically to communication interface 762.

In one example, communication channel 157A may couple communication interface 154A on optical backplane 150 to interconnect 167A. Possible routes for communication channel 157A are portrayed in FIG. 8A or FIG. 8B, although routes for communication channels over optical backplane 150 are not limited to these routes.

Figure 9:
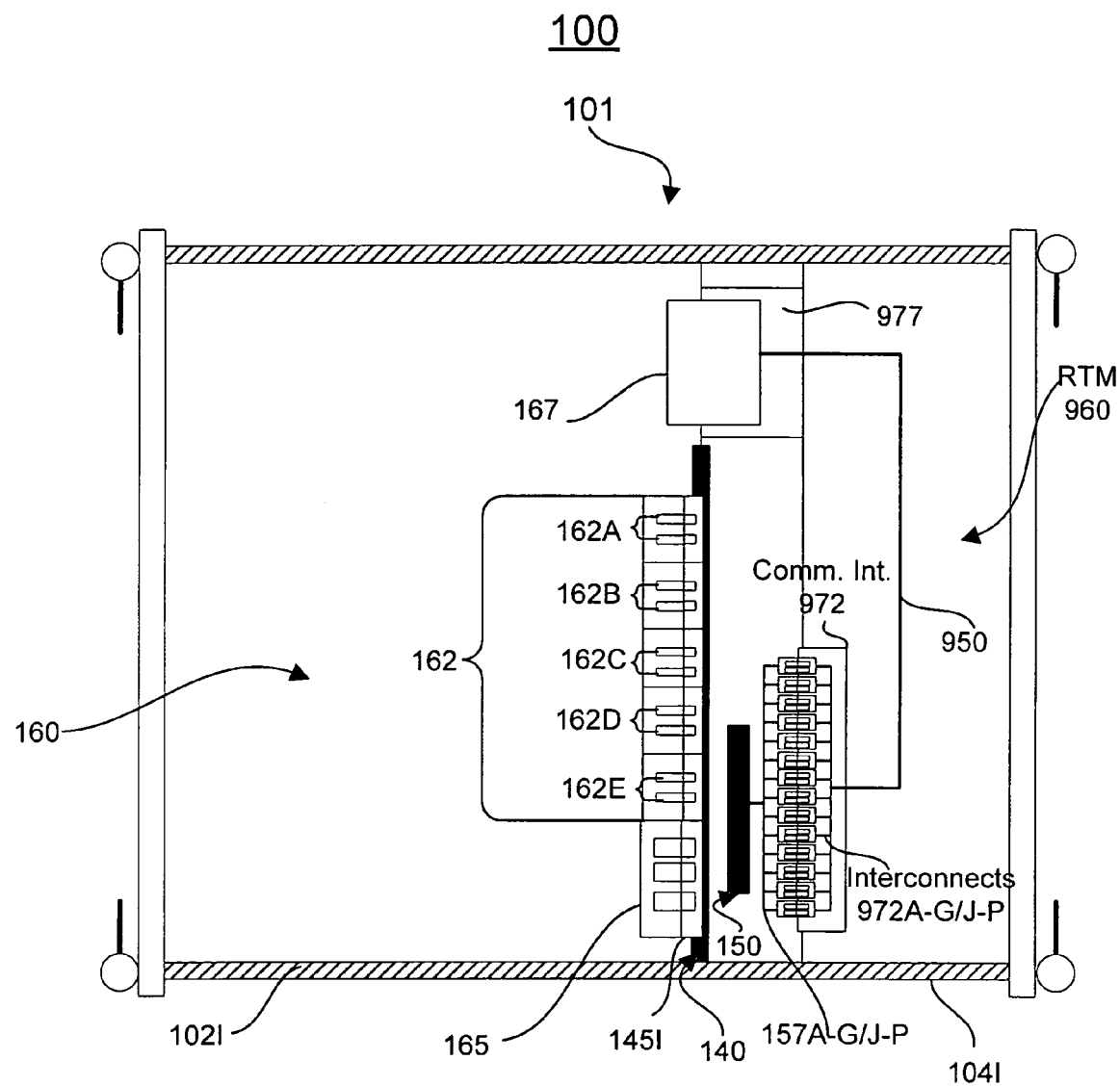
FIG. 9 provides a partial side view of the modular platform chassis with the switch/hub module and another example RTM received in the rear slot.

FIG. 9 provides a partial side view of modular platform chassis 101 with module 160 received in front slot 102I and RTM 960 received in rear slot 104I. In one example, RTM 960 includes communication interface 972 to couple to optical backplane 150. In one implementation, as portrayed in FIG. 9, communication interface 972 includes interconnects 972A-G/J-P. These interconnects may be configured to implement an optical coupling method to couple communication interface 972 to communication channels routed over optical backplane 150. These interconnects may include the VSCEL/photodiode arrays in the flip-chip assembly described above for interconnect 114A in FIG. 3. As shown in FIG. 9, communication channels 157A-G/J-P routed over optical backplane 150 may couple to interconnects 972A-G/J-P, respectively.

In one implementation, a module (e.g., module 110) may forward data via one of communication channels 157A-G/J-P. This data may follow an optical path that routes a communication channel from the module, over optical backplane 150 and to an interconnect included in communication interface 972 on RTM 960. In this implementation, an optical-to-electrical conversion is completed by at least one interconnect 972A-G/J-P and the data is then forwarded via electrical path(s) 950 (e.g., one or more copper-based traces) to communication interface 167 on module 160. Front board 160, for example, then forwards the data towards its destination, e.g., another module received in modular platform chassis 101 or remote to modular platform chassis 101. In one example, RTM 960 may reverse the process and convert electrical-to-optical data signals to forward data from module 160 over optical backplane 150.

Figure 10:
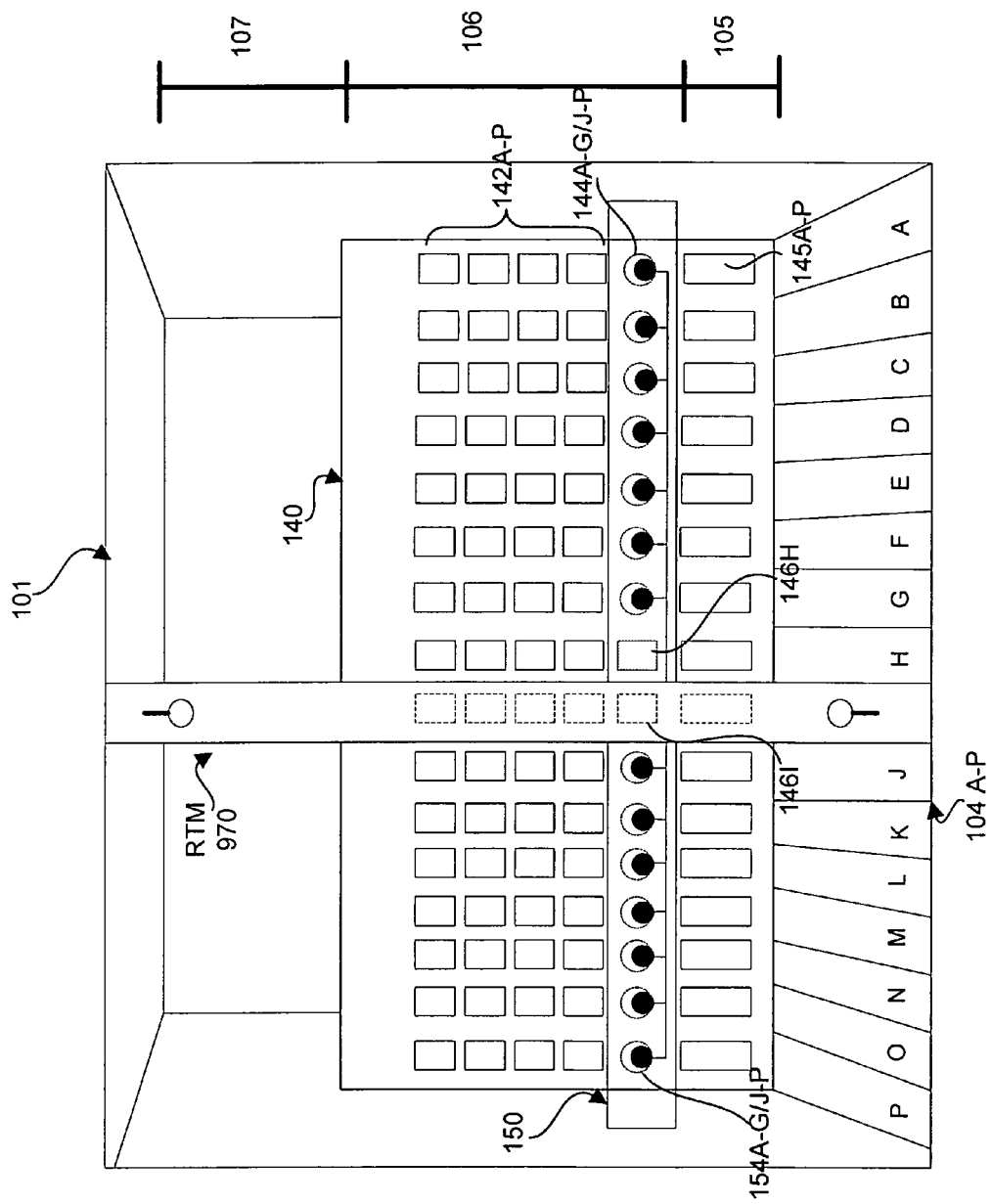
FIG. 10 provides a partial rear view of the modular platform chassis illustrating example routes for communication channels over the optical backplane to the other RTM.

FIG. 10 provides a partial rear view of modular platform chassis 101 with RTM 970 received in rear slot 104I. As depicted in FIG. 10, communication channels 157A-G/J-P are routed over optical backplane 150. In the example illustrated in FIG. 10, communication channels 157A-G/J-P are horizontally routed to the location associated with communication interface 972 (see FIG. 9). Although not shown, communication channels 157A-G/J-P, in one example, can be routed directly to communication interface 972.

Figure 11:
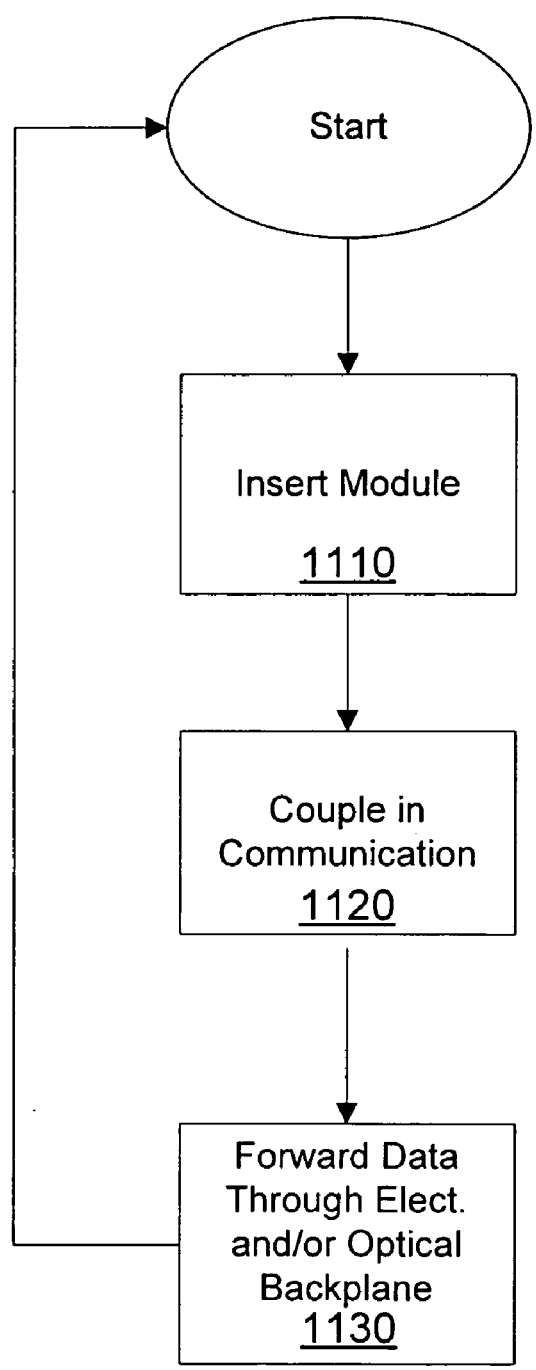
FIG. 11 is a flow chart of an example method to insert the module into the slot in the modular platform chassis to couple the module to an electrical and an optical backplane.

FIG. 11 is a flow chart of an example method to insert a module into a slot in a modular platform chassis to couple the module to an electrical and an optical backplane. In one implementation, the example method is implemented when module 110 is inserted in front slot 102A in modular platform chassis 101. In this example implementation, electrical backplane 140 in modular platform chassis 101 operates in compliance with the ATCA specification. Additionally, communication interface 112 on module 110 operates in compliance with the ATCA specification.

The process begins in block 1110, where in one example, module 110 is inserted in front slot 102A of modular platform chassis 101.

In block 1120, in one example, module 110 couples to the electrical and optical backplanes in modular platform chassis 101. For example, communication interface 112 couples to communication interface 142A on electrical backplane 140. As mentioned above, communication interface 112 is associated with a fabric interface on module 110. Interconnects 112A-D, for example, are used to couple that fabric interface to a communication channel routed over electrical backplane 140. The communication channel, for example, to couple module 110 in communication with other modules received or inserted in modular platform chassis 101's front slots.

As described above for FIG. 3, in one example, interconnect 114A is used to couple communication interface 114 on module 110 to communication interface 154A on optical backplane 150. This coupling, for example, is through opening 144A on electrical backplane 140. In one implementation, interconnect 114A is configured to couple a fabric interface associated with communication interface 114 to communication channel 157A. Communication channel 157A, for example, is routed over optical backplane 150 and to communication interfaces on hub or switch modules (e.g., module 160), mezzanine cards (e.g., mezzanine card 702I), or RTMs (e.g., RTM 960).

In block 1130, in one example, data is forwarded between module 110 and one or more other modules inserted or received in other slots in modular platform chassis 101. At least portions of this data, for example, is forwarded through the fabric interfaces associated with communication interfaces 112 and 114 and then through portions of the communication channels routed over electrical backplane 140 and/or optical backplane 150, respectively.

In one implementation, a fabric interface associated with communication interface 112 that couples to electrical backplane 140 utilizes one or more packet-based, communication protocols as described in the PICMG 3.x specifications. Also, electrical backplane 140, for example, supports or operates in compliance with these PICMG 3.x specifications. In one example, a fabric interface associated with communication interface 114 that couples to optical backplane 150 utilizes either packet-based (PICMG 3.x) or TDM-based (TFI-5) communication protocols. This utilization is based, for example, on what type of communication protocol optical backplane 150 is designed to support (e.g., PICMG 3.x, TFI-5, etc.).

The process then starts over, for example, when another module is inserted in a slot on modular platform chassis 101.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References made in this disclosure to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in his regard.

What is claimed is:

1. A chassis comprising:
   a plurality of slots to receive modules;
   an electrical backplane to couple to a module received in a first slot of the plurality of slots, the module to couple via a first communication interface on the module; and
   an optical backplane to couple to the module, the module to couple via a second communication interface on the module, wherein the optical backplane couples to the second communication interface on the module via at least one interconnect through an opening in the electrical backplane, the interconnect configured to couple a fabric interface associated with the second communication interface to a communication channel routed over the optical backplane.

2. A chassis according to claim 1, wherein the electrical backplane couples to the first communication interface on the module through at least one interconnect configured to couple a fabric interface associated with the first communication interface to a communication channel routed over the electrical backplane.

3. A chassis according to claim 1, the optical backplane further comprising:
   an optical path to route the communication channel, the optical path to include at least one optical path selected from the following group of: a plastic fiber, a glass fiber, a plastic waveguide and a glass waveguide.

4. A chassis according to claim 3, wherein the optical path comprises the optical path to route the communication channel to a communication interface on a switch module received in a second slot of the plurality of slots, the communication interface on the switch module to include an interconnect configured to couple the communication channel to a fabric interface associated with the switch module's communication interface.

5. A chassis according to claim 4, wherein the optical backplane comprises the optical backplane configured for the optical path to route the communication channel from the opening in the electrical backplane, horizontally along an opposing side of the electrical backplane to a location at a middle portion of the second slot to receive the switch module, and then vertically to the communication interface on the switch module, the communication interface on the switch module at another location at an upper portion of the second slot.

6. A chassis according to claim 4, wherein the optical backplane comprises the optical backplane configured for the optical path to directly route the communication channel from the opposing side to the opening in the electrical backplane to the communication interface on the switch module.

7. A chassis according to claim 3, wherein the optical path comprises the optical path to route the communication channel to a communication interface on a mezzanine card mounted at a location at an opposing side of the electrical backplane to a second slot of the plurality of slots, the second slot to receive a switch module, the communication interface on the mezzanine card to include an interconnect configured to couple the communication channel routed over the optical backplane to, a fabric interface associated with a communication interface on the switch module.

8. A chassis according to claim 3, wherein the optical path comprises the optical path to route the communication channel to a communication interface on a rear transition module received in a second of the plurality of slots, the second slot in a location at the opposing side of the electrical backplane to a third slot of the plurality of slots, the third slot to receive a switch module, the communication interface on the rear transition module to include an interconnect configured to couple the communication channel routed over the optical backplane to a fabric interface on the switch module.

9. A chassis according to claim 1, wherein the electrical backplane and the module received in the first slot operate in compliance with the Advanced Telecommunications Computing Architecture specification.

10. A chassis according to claim 9, wherein the opening in the electrical backplane is at a location corresponding to zone 2 on the Advanced Telecommunications Computing Architecture specification compliant electrical backplane.

11. A method comprising:
inserting a module in a slot in a chassis, the module including a communication interface to couple to an electrical backplane and another communication interface to couple to an optical backplane, both backplanes located within the chassis, the other communication interface to couple to the optical backplane via an interconnect through an opening in the electrical backplane;
coupling in communication the module to another module inserted in another slot in the chassis, the coupling in communication via at least one of the module's communication interfaces;
forwarding data between the module and the other module, the data forwarded through at least one communication interface coupled to the electrical backplane and/or through at least one communication interface coupled to the optical backplane.

12. A method according to claim 11, wherein coupling in communication via the communication interface to couple to the electrical backplane includes:
coupling a fabric interface associated with the communication interface to a communication channel routed over the electrical backplane, wherein the coupling includes an interconnect coupling in an impedance controlled manner to a copper-based trace, the copper-based trace to route the communication channel over the electrical backplane to a communication interface on the other module.

13. A method according to claim 11, wherein coupling in communication via the communication interface to couple to the optical backplane via an interconnect through an opening in the electrical backplane includes:
coupling a fabric interface associated with the communication interface to a communication channel routed over the optical backplane, wherein coupling includes an interconnect coupling in a wavelength division multiplexing manner to an optical path, the optical path to route the communication channel over the optical backplane to a communication interface on the other module.

14. A method according to claim 11, wherein the communication interface coupled to the electrical backplane is associated with a fabric interface, the electrical backplane and the fabric interface to operate in compliance with the Advanced Telecommunications Computing Architecture specification.

15. A method according to claim 14, wherein the communication interface coupled to the optical backplane is associated with a fabric interface, the optical backplane and the fabric interface to operate in compliance with the Time Division Multiplexing Fabric to Interface Implementation (TFI-5) specification.

16. A module to be received in a slot in a chassis, the module comprising:
a first communication interface to couple the module to an electrical backplane in the chassis via an interconnect configured to couple a fabric interface associated with the first communication interface to a communication channel routed over the electrical backplane; and
a second communication interface to couple the module to an optical backplane in the chassis via an interconnect through an opening in the electrical backplane, the interconnect configured to couple a fabric interface associated with the second communication interface to a communication channel routed over the optical backplane.

17. A module according to claim 16, wherein the interconnect configured to couple the fabric interface associated with the first communication interface to the communication channel routed over the electrical backplane comprises the interconnect configured to couple in an impedance controlled manner to a copper-based trace, the copper-based trace to route the communication channel over the electrical backplane.

18. A module according to claim 16, wherein the interconnect configured to couple a fabric interface associated with the second communication interface to a communication channel routed over the optical backplane comprises the interconnect to include a two-dimensional, micro electro-mechanical systems-controllable micro lens array that is integrated with a Vertical-Cavity-Surface-Emitting-Laser (VSCEL) array and a photodiode array, the interconnect to couple in a wavelength division multiplexing manner to an optical path, the optical path to route the communication channel over the optical backplane.

19. A module according to claim 18, wherein the fabric interface included in the second communication interface comprises the fabric interface to operate in compliance with the Time Division Multiplexing Fabric to Interface Implementation (TFI-5) specification.

20. A module according to claim 16, wherein the communication channel routed over the electrical backplane and the communication channel routed over the optical backplane are routed to one or more communication interfaces on another module received in another slot in the chassis, the module to forward data through the fabric interface associated with the first and/or the second communication interface to the other module.

21. A module according to claim 16, wherein the module is to operate in compliance with the Advanced Telecommunications Computing Architecture specification and the second communication interface is at a location on the module corresponding to a data transport connector in zone 2.

22. A system comprising:
a chassis to include a plurality of slots to receive modules, an electrical backplane, and an optical backplane;
a module received in a first slot of the plurality of slots; and
another module received in a second slot of the plurality of slots, the other module to include:
a first communication interface to couple the other module to the electrical backplane via an interconnect configured to couple a fabric interface associated with the first communication interface to a communication channel routed over the electrical backplane to a communication interface on the module received in the first slot; and
a second communication interface to couple the other module to the optical backplane via an interconnect through an opening in the electrical backplane, the interconnect configured to couple a fabric interface associated with the second communication interface to a communication channel routed over the optical backplane to a communication interface on one or more modules received in the plurality of slots.

23. A system according to claim 22, wherein the first communication interface to couple the other module to the electrical backplane via the interconnect comprises the interconnect configured to couple in an impedance controlled manner to a copper-based trace, the copper-based trace to route the communication channel over the electrical backplane.

24. A system according to claim 22, wherein the second communication interface to couple the other module to the optical backplane via the interconnect through the opening in the electrical backplane comprises the interconnect to include a two-dimensional, micro electromechanical systems-controllable micro lens array that is integrated with a Vertical-Cavity-Surface-Emitting-Laser (VSCEL) array and a photodiode array, the interconnect to couple in a wavelength division multiplexing manner to an optical path, the optical path to route the communication channel over the optical backplane.

25. A system according to claim 24, wherein the optical path comprises at least one optical path selected from the following group of: a plastic fiber, a glass fiber, a plastic waveguide and a glass waveguide.

26. A system according to claim 24, wherein the module received in the first slot of the plurality of slots comprises a switch module.

27. A system according to claim 26, wherein the communication channel routed over the optical backplane to the communication interface on one or more modules received in the plurality of slots comprises the communication interface on a rear transition module received in a third slot of the plurality of slots, the third slot in a location at the opposing side of the electrical backplane to the first slot that has received the switch module, the communication interface on the rear transition module to include an interconnect configured to couple to the communication channel routed over the optical backplane to a fabric interface on the switch module.

* * * * *